(12) United States Patent
Maresch et al.

(10) Patent No.: US 10,650,584 B2
(45) Date of Patent: May 12, 2020

(54) THREE-DIMENSIONAL MODELING SCANNER (71) Applicant: Konica Minolta Laboratory U.S.A., Inc., San Mateo, CA (US)

(72) Inventors: Markus Maresch, Hausmannstatten (AT); Stuart Guarnieri, Laramie, WY (US)

(73) Assignee: Konica Minolta Laboratory U.S.A., Inc., San Mateo, CA (US)

(*) Notice: Subject to any disclaimer, the term of this patent is extended or adjusted under 35 U.S.C. 154(b) by 8 days.

(21) Appl. No.: 15/942,000

(22) Filed: Mar. 30, 2018

(65) Prior Publication Data
US 2019/0304175 A1 Oct. 3, 2019

(51) Int. Cl.
G06T 15/00 (2011.01)
G06T 17/10 (2006.01)

(52) U.S. Cl.
CPC .......... G06T 17/10 (2013.01); G06T 2200/08 (2013.01)

(58) Field of Classification Search
None
See application file for complete search history.

(56) References Cited

U.S. PATENT DOCUMENTS

| 6,137,893 | A | 10/2000 | Michael et al. |
| 6,711,293 | B1 | 3/2004 | Lowe |
| 7,286,698 | B2 | 10/2007 | Arai et al. |
| 7,621,459 | B2 | 11/2009 | Hovis |
| 8,174,521 | B2* | 5/2012 | Harvill ................ G06T 15/04 345/419 |
| 8,408,476 | B2 | 4/2013 | Sun et al. |
| 9,215,453 | B2* | 12/2015 | Macchia ............. G01B 11/245 |
| 9,589,362 | B2* | 3/2017 | Sarkis ................. G06T 19/00 |
| 9,990,767 | B1* | 6/2018 | Sheffield ........... H04N 5/23206 |
| 2005/0196042 | A1* | 9/2005 | Gehrig .................. G06K 9/32 382/175 |
| 2006/0017720 | A1* | 1/2006 | Li ...................... G01B 11/2504 345/419 |
| 2010/0238271 | A1* | 9/2010 | Pfeiffer ................. A43D 1/06 348/46 |

(Continued)

FOREIGN PATENT DOCUMENTS

WO 2015-108071 A1 7/2015

OTHER PUBLICATIONS

O. Ozyesil et al; "A Survey of Structure from Motion"; Cornell University Library, arXiv:1701.0893v1; Retrieved from Internet: URL: https://arxiv.org/abs/1701.08493; Jan. 30, 2017 (35 pages).

(Continued)

Primary Examiner — Anh-Tuan V Nguyen
(74) Attorney, Agent, or Firm — Osha Liang LLP (57) ABSTRACT A method is disclosed for generating a three-dimensional (3D) model of a target object. The method includes obtaining one or more image capture settings and capturing, using the one or more image capture settings, a plurality of two-dimensional (2D) images each including at least a portion of a coded target and at least a portion of the target object. The method further includes transmitting the plurality of 2D images to a model generation server and generating, by the model generation server based on the plurality of 2D images, the 3D model of the target object and one or more model characteristics of the 3D model.

19 Claims, 7 Drawing Sheets

(56) References Cited

U.S. PATENT DOCUMENTS

| | | | | |
|---|---|---|---|---|
| 2011/0081072 | A1* | 4/2011 | Kawasaki | G01B 11/25 382/154 |
| 2012/0314031 | A1* | 12/2012 | Shotton | G06K 9/00375 348/46 |
| 2013/0156316 | A1* | 6/2013 | Masuko | G06K 9/34 382/173 |
| 2013/0242057 | A1* | 9/2013 | Hong | G06T 5/50 348/47 |
| 2014/0210856 | A1* | 7/2014 | Finn | G01C 15/002 345/633 |
| 2015/0054949 | A1* | 2/2015 | Scalisi | H04N 7/188 348/143 |
| 2015/0170416 | A1* | 6/2015 | McGregor | G06T 19/20 345/420 |
| 2017/0099443 | A1* | 4/2017 | Shroff | H04N 5/2621 |
| 2017/0228864 | A1* | 8/2017 | Liu | G06T 7/80 |
| 2017/0249783 | A1* | 8/2017 | Mach Shepherd | G06T 17/00 |
| 2017/0272728 | A1* | 9/2017 | Rafii | H04N 13/239 |

OTHER PUBLICATIONS

"How to 3D Scan Body Parts for Prosthetic or Any Use", Retrieved from Internet Mar. 29, 2018; URL: https://www.instructables.com/id/How-to-3D-Scan-Body-Parts-for-CAD-Modeling-and-Mak/ (10 pages).

"Multiple Raspberry PI-3D Scanner", Retrieved from the Internet on Mar. 29, 2018; URL: https://www.instructables.com/id/Multiple-Raspberry-PI-3D-Scanner (19 pages).

"Commercial high end full body scanner", Retrieved form Internet on Mar. 29, 2018; URL: http://web.twindom.com (4 pages).

"Full-body CT scan", Retrieved from the Internet on Mar. 29, 2018; URL: https://en.wikipedia.org/wiki/Full-body_CT_scan (4 pages).

"Full body scanner", Retrieved from the Internet on Mar. 29, 2018; URL: https://en.wikipedia.org/wiki/Full_body_scannner (10 pages).

"3D body scanner—3D body shape and measurement visualization", Retrieved from the Internet on Mar. 29, 2018; URL:https://www.styku.com (11 pages).

"3D Scanning of body parts and faces", Retrieved from the Internet on Mar. 29, 2018; URL: https://www.cnc-step.de/en/3d-scanning (5 pages).

* cited by examiner

THREE-DIMENSIONAL MODELING SCANNER

BACKGROUND

A three-dimensional (3D) model of an object may describe various aspects of the object (e.g., dimensions, color, texture). With sufficient amounts of data, 3D models may be used in various 3D printing applications, interactive visualizations, measurements, and many other suitable applications. However, collection and generation of data for the creation of 3D models may be complex (e.g., for non-rigid objects such as body parts). Furthermore, capture and generation of 3D models may require sophisticated and expensive equipment such as various sensors. Additionally, capture and generation of 3D models can require significant amounts of time and/or computational resources.

In some examples, orthotics and prosthetics require accurate models of human extremities including the geometry of the object to be modeled. The automatic modeling of human beings or particular body parts (e.g., faces, arms, hands, feet, legs) may be challenging because the objects may not be rigid or there may be challenges associated with holding still for periods of time (e.g., children, the elderly, or trembling patients). Additional challenges may relate to the natural skin of body parts not necessarily being well textured for 3D reconstruction.

SUMMARY

In accordance with embodiments of the invention, a method is disclosed for generating a three-dimensional (3D) model of a target object, the method comprises: obtaining one or more image capture settings; capturing, using the one or more image capture settings, a plurality of two-dimensional (2D) images each including at least a portion of a coded target and at least a portion of the target object; transmitting the plurality of 2D images to a model generation server; generating, by the model generation server based on the plurality of 2D images, the 3D model of the target object and one or more model characteristics of the 3D model.

In some aspects, the method further comprises: capturing a plurality of 2D calibration images each including at least a portion of a coded target; generating the one or more image capture settings based on the 2D calibration images; and storing the one or more image capture settings.

In some aspects, each of the 2D calibration images further includes at least a portion of a calibration object.

In some aspects, the one or more model characteristics comprise at least one of: a scale, a texture, and a color.

In some aspects, each of the coded targets included in the plurality of 2D images comprises at least one of: a concentric circle pattern, a binary dot pattern, a character, and a line.

In some aspects, each of the coded targets is unique.

In some aspects, the method further comprises: generating, by the model generation server, a 3D printable model based on the 3D model and the one or more model characteristics; and storing the 3D printable model.

In accordance with embodiments of the invention, a method is disclosed for constructing a three-dimensional (3D) modeling scene, the method comprises: capturing a first image using a first camera and a second image using a second camera, wherein the first image comprises a first coded target and the second image comprises a second coded target; determining a first camera characteristic set based on the first image and the first coded target, determining a second camera characteristic set based on the second image and the second coded target; generating, based on the first camera characteristic set and the second camera characteristic set, one or more scene characteristics; and storing the one or more scene characteristics as the 3D modeling scene.

In some aspects, each of the first coded target and the second coded target comprises at least one of: a concentric circle pattern, a binary dot pattern, a character, and a line.

In some aspects, the first camera characteristic set comprises at least one of: a camera angle and a camera orientation, and wherein the one or more scene characteristics comprise at least a scale.

In accordance with embodiments of the invention, a system is disclosed for generating a three-dimensional (3D) model of a target object, the system comprises: an enclosure; a plurality of cameras disposed around the enclosure; and a model generation server, wherein the plurality of cameras capture, using one or more image capture settings, a plurality of two-dimensional (2D) images each including a coded target and at least a portion of the target object; wherein the plurality of cameras transmit the plurality of 2D images to the model generation server; wherein the model generation server generates the 3D model of the target object and one or more model characteristics of the 3D model based on the plurality of 2D images.

In some aspects, the enclosure further comprises a plurality of coded targets.

In some aspects, the system further comprises: a camera group controller that controls the plurality of cameras, wherein the camera group controller obtains the one or more image capture settings prior to the capture by the plurality of cameras, wherein the camera group controller triggers the capture by the plurality of cameras, and wherein the plurality of cameras further transmit the plurality of 2D images to the model generation server via the camera group controller.

In some aspects, the system further comprises: a second camera group controller that controls a second plurality of cameras, wherein the second camera group controller obtains the one or more image capture settings, wherein the second camera group controller triggers the second plurality of cameras to capture, using the one or more image capture settings, a second plurality of 2D images each including a coded target and at least a portion of the target object, and wherein the second plurality of cameras transmit the second plurality of 2D images to the model generation server via the second camera group controller.

In some aspects, the model generation server further comprises a memory, wherein the model generation server further generates a 3D printable model based on the 3D model and the one or more model characteristics and stores the 3D printable model in the memory.

In some aspects, the enclosure forms one of: a cuboid, a cylinder, and a spheroid.

In accordance with embodiments of the invention, a system is disclosed for constructing a three-dimensional (3D) modeling scene, the system comprising: an enclosure; a first camera and a second camera each disposed around the enclosure; and a model generation server, wherein the first camera captures a first image including a first coded target and transmits the first image to the model generation server wherein the second camera captures a second image including a second coded target and transmits the second image to the model generation server; wherein the model generation server: determines a first camera characteristic set based on the first image and the first coded target, determines a second camera characteristic set based on the second image and the second coded target, generates, based on the first camera characteristic set and the second camera characteristic set, one or more scene characteristics, and stores the one or more scene characteristics as the 3D modeling scene.

In some aspects, the enclosure further comprises the first coded target and the second coded target.

In some aspects, the enclosure forms one of: a cuboid, a cylinder, and a spheroid.

In some aspects, the system further comprises: a camera group controller that controls the first camera and the second camera, wherein the camera group controller obtains one or more image capture settings prior to the capture by the first camera and the second camera, wherein the camera group controller triggers the capture by the first camera and the second camera, and wherein the first camera and the second camera further transmit the first image and the second image, respectively, to the model generation server via the camera group controller.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide one or more methods and systems for generating three-dimensional (3D) models based on scanning one or more target objects. In one or more embodiments of the invention, coded targets are utilized to streamline the scanning, capture, and processing of image data. The methods and systems generate 3D models that may be used for 3D printing applications. For example, a 3D model may be generated for a body part. The generated 3D model may then be utilized, for example, in a 3D printing application for the creation of orthotics or prosthetics. In other words, one or more embodiments may automate one or more procedures for capturing 3D models of target objects. Further, one or more embodiments capture various characteristics of the target objects, for example, geometry and texture of various surfaces (e.g., skin).

Figure 1:
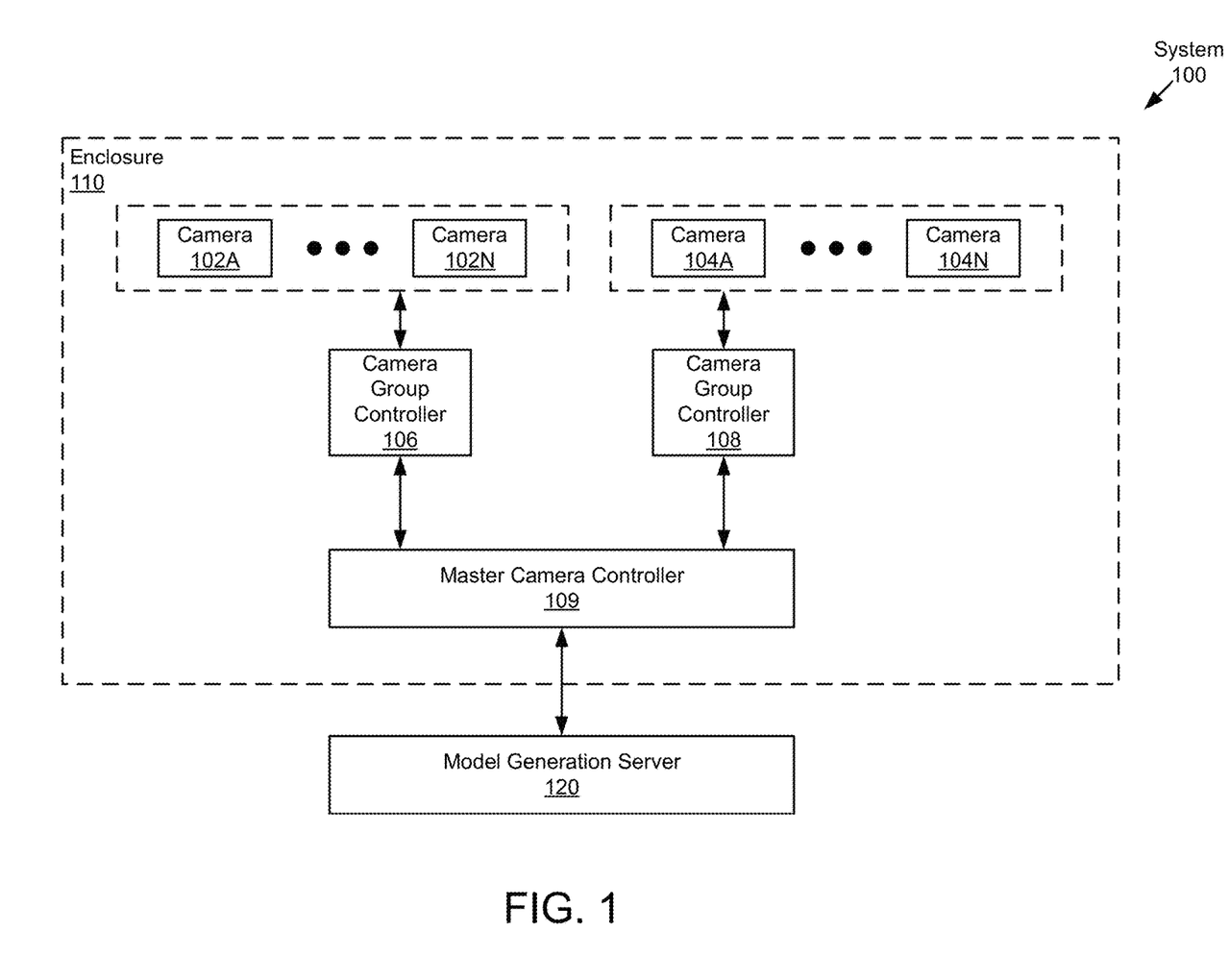
FIG. 1 shows a system in accordance with one or more embodiments of the invention.

FIG. 1 shows a system (100) in accordance with one or more embodiments of the invention. As shown in FIG. 1, the system (100) has multiple components, including, for example, cameras (102A-102N), cameras (104A-104N), camera group controllers (106) and (108), a master camera controller (109), an enclosure (110) and a model generation server (120). Each of the components (e.g., 106, 108, 109, 120) may be located on the same computing device (e.g., personal computer (PC), laptop, tablet PC, smart phone, multifunction printer, kiosk, server, etc.) or on different computing devices connected by a network of any size having wired and/or wireless segments. In other words, the camera group controllers (106) and (108) and the master camera controller (109) may be discrete devices, may be logical units of a single controller, or may be located in the model generation server (120). Each of these components is discussed below.

In one or more embodiments of the invention, the cameras (102A-102N) may be off-the-shelf digital cameras, specialized cameras, cell-phones having built-in cameras, or any other cameras suitable for the capture of a two-dimensional (2D) image. For example, it may be advantageous for the cameras (102A-102N) to be spectrally compatible or at least partially spectrally compatible. Similarly, the cameras (104A-104N) may be off-the-shelf digital cameras, specialized cameras, cell-phones having built-in cameras, or any other cameras suitable for the capture of a 2D image. The cameras (102A-102N) may be of the same type or model as the cameras (104A-104N). In one or more embodiments, each of the cameras (102A-102N) and (104A-104N) may stand alone or may grouped into a particular camera group.

In one or more embodiments of the invention, the cameras (102A-102N) and (104A-104N) are disposed on or around the enclosure (110). The enclosure (110) may be any enclosure, of any size and shape, suitable for positioning a target object and aiming the cameras (102A-102N) and (104A-104N) toward the target object. Thus, the enclosure (110) may be, for example, a cube, cuboid, a cylinder, a half-spheroid, or any other shape suitable for disposing the cameras (102A-102N) and (104A-104N) for capturing images of the target object. In one or more embodiments, one side of the enclosure (110) may be open (e.g., a lid, not shown) for applying the target object (e.g., a hand or foot). In one or more embodiments, the enclosure (110) may be a semi-sphere (e.g., 80% of a sphere with a hole).

In one or more embodiments, the inside of the enclosure (110) may be textured with one or more coded targets (also referred to as measurement targets). In one or more embodiments, the cameras (102A-102N) and/or (104A-104N) may be arranged around the enclosure (110) and directed inward toward the center of the enclosure (110). The cameras (102A-102N) and/or (104A-104N) need not necessarily be directed to the center of the enclosure, but may also be directed toward the center of the target object or in any other suitable direction for scanning and capturing the scene. In one or more embodiments, the cameras (102A-102N) and/or (104A-104N) may effectively cover most of the inner surface around the center of the target object from all directions. For example, the angle between any adjacent camera pair may not exceed approximately 30 degrees. In one or more embodiments, the cameras (102A-102N) and/or (104A-104N) may span the equivalent of an irregular triangular mesh on a sphere. The enclosure (110) may include one or more lighting elements (not shown). For example, the enclosure (110) may include LED or incandescent bulbs that illuminate the target object or coded targets for improved capture of the target object or the scene. Additional examples of the enclosure (110) and arrangement of the cameras (102A-102N) and/or (104A-104N) will be discussed further below with reference to FIGS. 4A-4C.

In one or more embodiments of the invention, the master camera controller (109) may be implemented in hardware (i.e., circuitry), software, or any combination thereof. The master camera controller (109) may control one or more camera group controllers (106) and (108). The master camera controller (109) may serve to synchronize the cameras (102A-102N, 104A-104N) such that an image capture may be performed with a particular timing. In other words, the master camera controller (109) may control the trigger of the image capture. The master camera controller (109) may trigger a timed or synchronized image capture by way of the camera group controllers (106) and (108). In one or more embodiments, the master camera controller (109) may be a process on one or more of the camera group controllers (106) and (108) that may, for example, be determined at a system boot time.

In one or more embodiments of the invention, the camera group controllers (106) and (108) may be implemented in hardware (i.e., circuitry), software, or any combination thereof. The camera group controller (106) may control a group of one or more cameras (102A-102N). Similarly, the camera group controller (108) may control a group of one or more cameras (104A-104N). As mentioned above, either or both of camera group controllers (106) and (108), as well as the master camera controller (109), may be standalone or may be integrated into the model generation server (120). In other words, in one or more embodiments, the cameras (102A-102N, 104A-104N) may be connected to the model generation server (120) via the camera group controllers (106) and (108) and the master camera controller (109) or may be directly connected to the model generation server (120). The connections between the cameras (102A-102N) and (104A-104N), the camera group controllers (106) and (108), the master camera controller (109), and the model generation server (120) may be any combination of wired or wireless connections (e.g., Ethernet, USB, Bluetooth, WiFi or any other suitable connection interface).

In one or more embodiments of the invention, the camera group controller (106) may collect, generate, and store one or more image capture settings for the cameras (102A-102N). Similarly, the camera group controller (108) may collect, generate, and store one or more image capture settings for the cameras (104A-104N). Further, the camera group controllers (106) and (108) may transmit configuration information for the image capture settings to the respective cameras (102A-102N) and (104A-104N). Additionally, in one or more embodiments, the camera group controllers (106) and (108) may trigger the respective cameras (102A-102N) and (104A-104N) to initiate an image capture. Additionally, the master camera controller (109) may trigger the respective cameras (102A-102N) and (104A-104N) to initiate an image capture either directly or by way of the camera group controllers (106) and (108). In one or more embodiments, the model generation server (120) may initiate the image capture either directly, via the camera group controllers (106) and (108), or via the master camera controller (109).

In one or more embodiments, the camera group controller (106) may serve as an aggregation point for the cameras (102A-102N). In other words, the camera group controller (106) may collect images captured by each of the cameras (102A-102N), which may then be transmitted either separately or as a collection to the model generation server (120). Similarly, the camera group controller (108) may serve as an aggregation point for the cameras (104A-104N). In other words, the camera group controller (108) may collect images captured by each of the cameras (104A-104N), which may then be transmitted either separately or as a collection to the model generation server (120). Similarly, the master camera controller (109) may serve as an aggregation point for all of the cameras (102A-102N, 104A-104N) or the camera group controllers (106) and (108).

In one or more embodiments of the invention, the model generation server (120) may be implemented in hardware (i.e., circuitry), software, or any combination thereof. The model generation server (120) may receive images captured by the cameras (102A-102N) and (104A-104N) either directly or by way of the camera group controllers (106) and (108), respectively.

In one or more embodiments of the invention, the model generation server (120) processes images captured by the cameras (102A-102N) and (104A-104N) to generate a 3D model of a target object. The model generation server (120) may employ one or more algorithms for generating a 3D model, for example, Structure from Motion (SfM), photogrammetry or photogrammetric reconstruction, and 3D reconstruction from 2D images. Furthermore, the model generation server (120) may employ a Scale-Invariant Feature Transform (SIFT) algorithm for the generation of the 3D model such as those described in, for example, U.S. Pat. No. 6,711,293 ("Method and apparatus for identifying scale invariant features in an image and use of same for locating an object in an image").

In one or more embodiments of the invention, the model generation server (120) may generate and store one or more characteristics of the 3D model. For example, 3D model characteristics may include dimensions, textures, and colors, as well as others. In one or more embodiments, the model generation server (120) may generate the one or more characteristics from images captured by the cameras (102A-102N) and (104A-104N).

Figure 2:
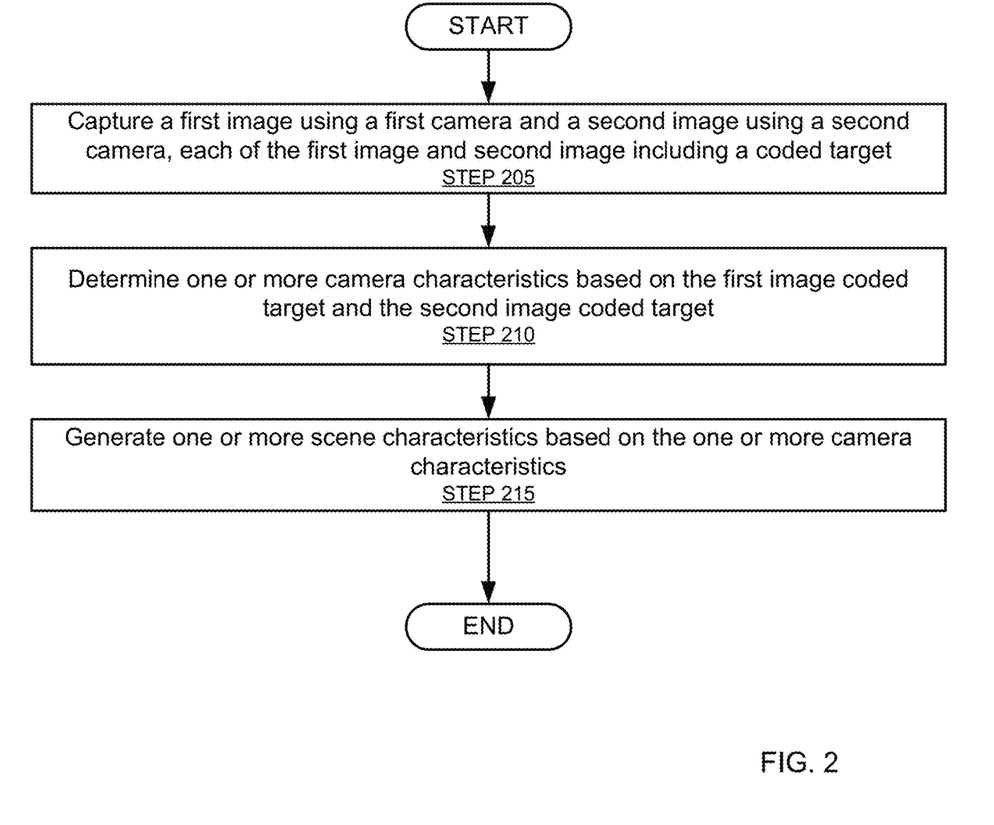
FIG. 2 shows a flowchart in accordance with one or more embodiments of the invention.

FIG. 2 shows a flowchart in accordance with one or more embodiments of the invention. The flowchart depicts a process for characterizing a scene that may be used for 3D model generation. In one or more embodiments in accordance with FIG. 2, machine vision for characterizing a scene for 3D model generation is given a starting hint. For example, a "starting hint" may be a number of unique points in order to match pairs (or other collections) of images across a recording scene. The "starting hint" or "unique points" may take the form of one or more patterns designed to allow and support the automatic finding of salient features. The "starting hint" may be found automatically by an image matcher (or computer vision) employing, for example, the SIFT algorithm discussed above. For example, a set of 30 to 500 points, which may be fairly unique and distinguishable, may be used between pairs of images by way of coded targets. In other words, coded targets may advantageously provide system stability by providing a self-organizing geometry in combination with, for example, the SIFT algorithm. The one or more patterns may also be one or more calibration targets. For example, the patterns or calibration targets may be computer generated binary images. Hereinafter, the calibration targets or patterns may also be referred to as "coded targets."

In one or more embodiments of the invention, the coded targets may be unique concentric circular patterns in three corners of an image, for example. In such a case, the ratios of the radii of concentric circles allow for a small number (e.g., 4-16 or $2^N$ where $2<=N<=4$)) of well recognizable patterns having high confidence of identification.

In one or more embodiments of the invention, the coded targets may be binary random patterns or binary dot patterns, which are bounded by a surrounding box. The coded targets may be letters or digits in a suitably large font. Those skilled in the art will appreciate that some characters, such as capital 'O' and zero '0' may be avoided due to potential ambiguity.

In one or more embodiments of the invention, the coded targets may have long thin lines close to boundary of the coded target. These lines may generally map to non-linear curves due to the radial distortion of a lens. The latter parameter may be of interest, as it may need to be estimated, corrected, and verified. Furthermore, these lines may extend in both dimensions, particularly if multiple patterns are used. Additionally, the lines may intentionally not intersect so as to support simpler line pixel collections in both directions.

In one or more embodiments of the invention, the coded targets may be formed individually by any of the above examples. Furthermore, the coded targets may be formed by various combinations of the above examples. Additional examples of the coded targets will be described further below with reference to FIGS. 5A-5C. In one or more embodiments, the relative orientation of pairs of images can be found with high confidence by relying on the coded targets alone.

One or more of the steps in FIG. 2 may be performed by the components of the system (100), discussed above in reference to FIG. 1. In one or more embodiments of the invention, one or more of the steps shown in FIG. 2 may be omitted, repeated, and/or performed in a different order than the order shown in FIG. 2. Accordingly, the scope of the invention should not be considered limited to the specific arrangement of steps shown in FIG. 2.

Referring to FIG. 2, initially, a first image is captured using a first camera and a second image is captured using a second camera (STEP 205). Each of the first image and the second image may be captured within a short period of time such that the pair of images may be effectively synchronized. Each of the first image and the second image includes, at least, one or more coded targets with a reasonable overlap. For example, the first image and the second image may overlap by 60%-70%. However, other ranges may also be suitable. As discussed above, the coded targets may take on the form of one or more patterns. Further, in the case that the first image and the second images are captured within a sufficiently short time, the coded targets and the target object may form a temporally rigid system. In other words, the delay between individual image captures may be sufficiently small to afford the appearance of being simultaneous with respect to motion of the coded targets or the target object. For example, effective synchronization may be possible over longer periods of time (e.g., several minutes) for a rigid target object such as a statue. Effective synchronization may also only be possible over shorter periods of time (e.g., sub-second) for a target object such as a human. Those skilled in the art will appreciate that the steps of FIG. 2 may be performed for more than two cameras without departing from the spirit or scope of the invention.

In STEP 210, one or more characteristics of the cameras are determined based on the first image coded target and the second image coded target. The one or more characteristics of the cameras may be relative characteristics. For example, in one or more embodiments, the location, orientation, and angle of the cameras may be determined based on the coded targets. In one or more embodiments, a calibration object of a known size and shape may be used either separately or in conjunction with the coded targets to determine the camera characteristics.

In STEP 215, one or more scene characteristics may be generated based on the one or more camera characteristics. For example, in one or more embodiments, the dimensions of the scene may be determined based on the coded targets. As mentioned above, the coded targets may have a predetermined size and shape used as a basis for determining the characteristics of the scene. As also mentioned above, a calibration object may be utilized in conjunction with the coded targets. In other words, a calibration object of a known size and shape may be used separately or in conjunction with the coded targets to determine the characteristics of the scene.

Advantageously, in one or more embodiments in accordance with FIG. 2, an orientation of all cameras and a reconstruction of the scene may be captured. Additionally, both geometry and texture may be captured after a proper reconstruction of a recording scene in accordance with FIG. 2. Those skilled in the art will appreciate that camera calibration may not be necessary as part of a preparation for the recording. In other words, the recording and capture with coded targets may allow for enough points to completely reconstruct the scene in addition to all internal parameters of all of the cameras. One or more additional advantages may be estimation, verification, and correction of lens distortion that may have not otherwise been known to the capturing system. Additionally, in the preparation of a recording scene, the most orthogonal view may be sought for direct measurement of a target object (i.e., a perpendicular view). In one or more embodiments in accordance with FIG. 2, the most orthogonal view may be determined based on one or more of the scene and camera characteristics. Further, the scene and camera characteristics may allow for an automatic encoding of a "ground truth." In other words, the scale (e.g., horizontal scale and vertical scale) of the scene can be determined because distances of the centers of, for example, three corner patterns are recognizable in the image captures (i.e., machine vision) and an absolute orientation may be determined.

Figure 3:
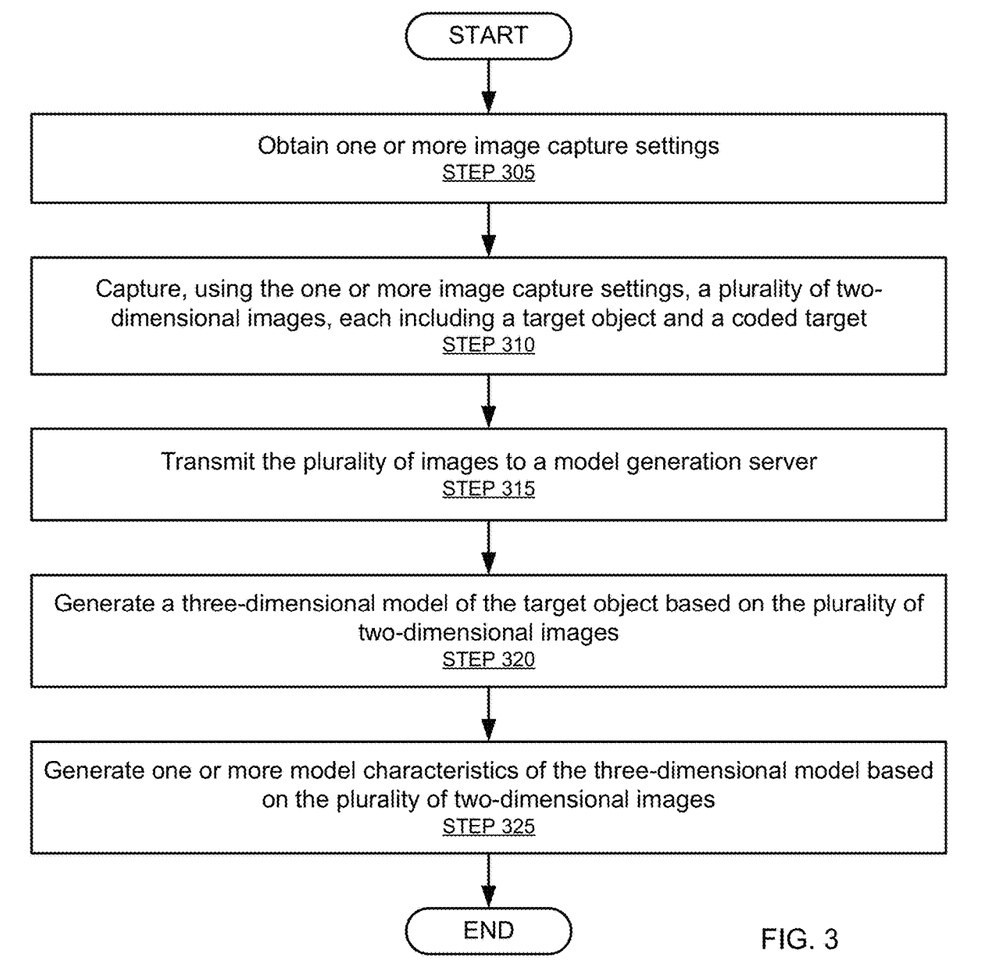
FIG. 3 shows a flowchart in accordance with one or more embodiments of the invention.

FIG. 3 shows a flowchart in accordance with one or more embodiments of the invention. The flowchart depicts a process for capturing and generating a 3D model of a target object. Additionally, one or more embodiments of the invention in accordance with FIG. 3 may use the one or more characteristics of a capturing scene obtained and generated in accordance with FIG. 2, described above. Alternatively or additionally, one or more embodiments in accordance with FIG. 3 may determine scene characterizations in real time.

One or more of the steps in FIG. 3 may be performed by the components of the system (100), discussed above in reference to FIG. 1. In one or more embodiments of the invention, one or more of the steps shown in FIG. 3 may be omitted, repeated, and/or performed in a different order than the order shown in FIG. 3. Accordingly, the scope of the invention should not be considered limited to the specific arrangement of steps shown in FIG. 3.

Referring to FIG. 3, initially, one or more image capture settings are obtained (STEP 305). The image capture settings may be predetermined or be determined by the camera characteristics or the scene characteristics determined in FIG. 2, for example. As discussed above, the image capture settings may be obtained by or transmitted to one or more cameras. Alternatively or additionally, a camera group controller may obtain the one or more image capture settings for the one or more cameras.

In STEP 310, a plurality of 2D images are captured by the one or more cameras using the one or more image capture settings. Each of the plurality of 2D images contains, at least, a portion of the target object and a coded target. One or more of the plurality of 2D images may contain the entire target object or only a portion of a coded target. In one or more embodiments of the invention, the plurality of 2D images are captured simultaneously or nearly simultaneously. As discussed above, a level of simultaneity may have several factors such as the motion of coded targets, motion of the target object, or the lighting of the system. That is, the concept of simultaneous capture may be several minutes or hours in some systems and less than 0.01 seconds in other systems. Advantageously, near simultaneous capture of the plurality of 2D images may allow for a reduced amount of time that the target object must be within an enclosure or in other words within the focal area of the one or more cameras.

Additionally, in one or more embodiments in accordance with STEP 310, the capture of the plurality of 2D images may be triggered by a model generation server, by one or more camera group controllers, or by the master camera controller. Alternatively or additionally, the capture of the plurality of 2D images may be triggered manually or by a timer.

In STEP 315, the plurality of images are transmitted to a model generation server. As discussed above, the plurality of images may be transmitted by the cameras directly or aggregated and transmitted by a camera group controller or the master camera controller.

In STEP 320, a model generation server generates a 3D model of the target object based on the plurality of 2D images. As discussed above, the model generation server may use one or more methods for generating a 3D model from the 2D images, for example, any Structure from Motion (SfM) algorithm. Additionally, the model generation server may use the coded targets in the plurality of 2D images in the generation of the model to determine, for example, appropriate dimensions of the target object. As discussed above, the model generation server may have characterized the scene, for example, as described in reference to FIG. 2. As such, the model generation server may use one or more of the scene and camera characteristics to determine various features of the target object to integrate into the 3D model of the target object. For example, the various features may include dimensions, texture, and color.

In STEP 325, the model generation server may derive one or more characteristics describing the 3D model of the target object and the coded targets based on the plurality of 2D images. The one or more characteristics describing the 3D model of the coded targets may be discarded after a suitable 3D model of the target object is reconstructed. As discussed above, the model generation server may use the coded targets in the plurality of 2D images in the generation of the one or more characteristics of the 3D model to determine, for example, appropriate dimensions of the target object. As also discussed above, in one or more embodiments, the model generation server may have characterized the scene, for example, described in FIG. 2, and may use one or more of the scene and camera characteristics to determine various features describing one or more characteristics of the 3D model of the target object, for example, dimensions, texture, and color.

Figure 4A:
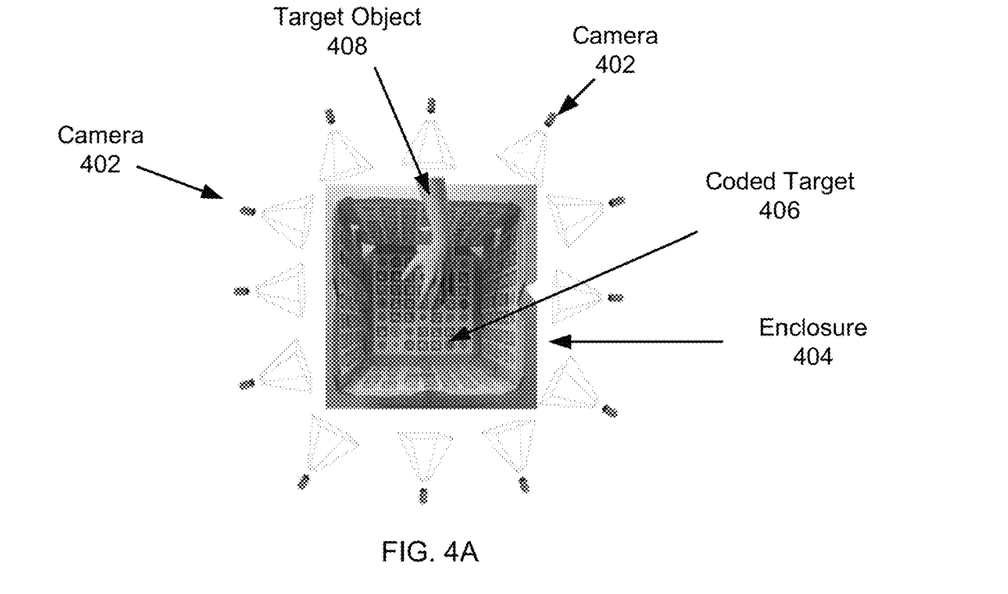
FIGS. 4A-4C show examples in accordance with one or more embodiments of the invention.
Figure 4B:
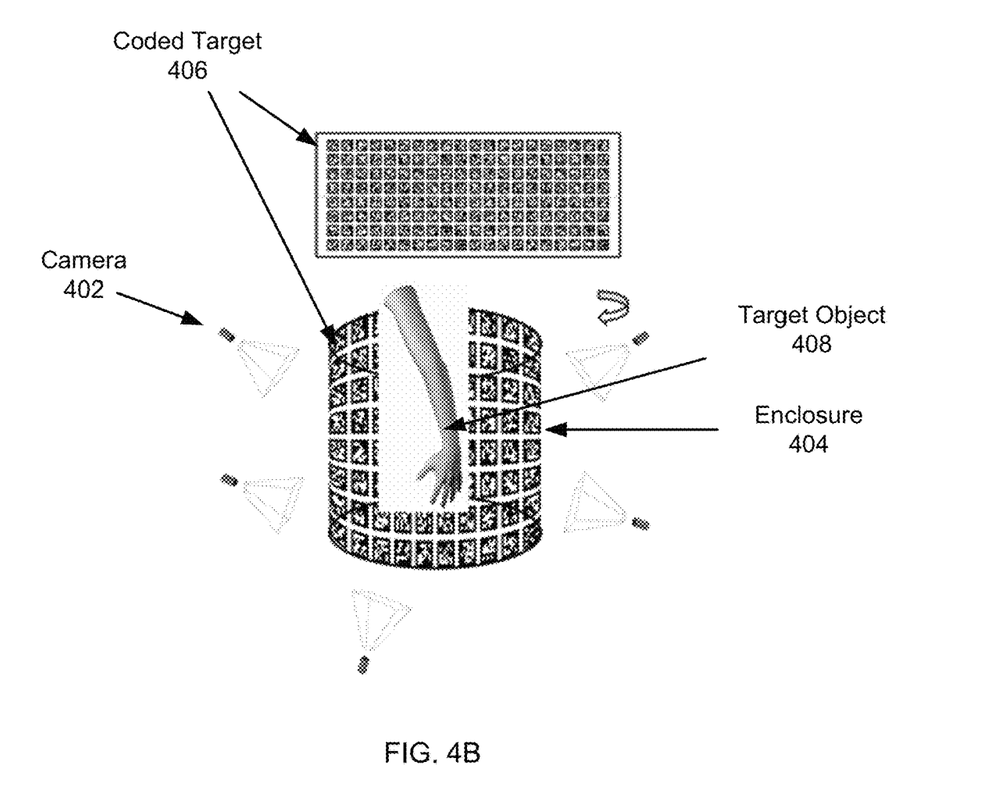
Figure 4C:
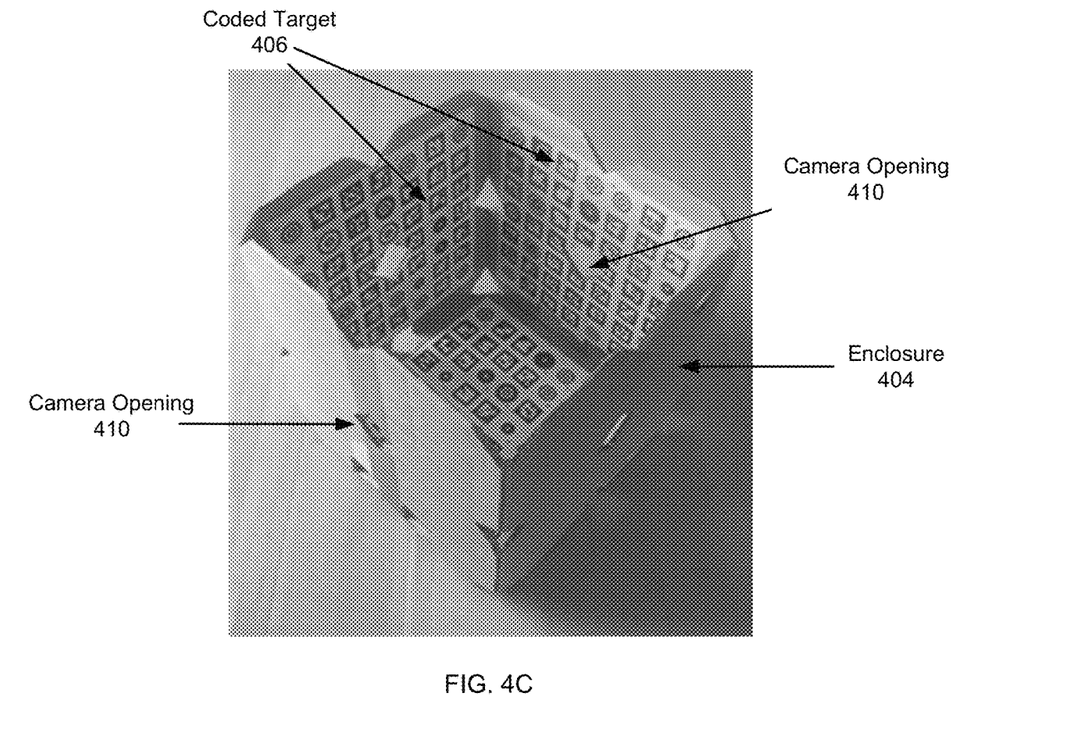

FIGS. 4A-4C show examples in accordance with one or more embodiments of the invention. In one or more embodiments, the example systems and methods described above in reference to FIGS. 1-3 are applied in the example shown in FIGS. 4A-4C. However, it will be apparent to one of ordinary skill in the art that different methods and systems may be applied. Although a human hand is used as the target object in FIG. 4A-4B for purposes of illustration, the invention may also be directed toward capturing a 3D model of any suitable object (e.g., an arm, a leg, or a foot).

FIG. 4A shows a top-down view of an example in accordance with one or more embodiments of the invention. In the example described in FIG. 4A, an enclosure (404) takes the form of a cuboid structure with an open top. A plurality of cameras (402) are disposed on or around the enclosure (404) directed inward toward the center of the enclosure. As discussed above, the cameras (402) need not necessarily be directed to the center of the enclosure (404), but may instead focus partially on various aspects of, for example, a target object (408). In one or more embodiments, the enclosure (404) also contains one or more coded targets (406). As shown in the example in accordance with FIG. 4A, the coded targets (406) are disposed along each inside wall of the cuboid. As described above, the coded targets (406) may include one or more suitable patterns.

FIG. 4B shows an exemplary view of a cylindrical enclosure in accordance with one or more embodiments of the invention. Specifically, in one or more embodiments in accordance with FIG. 4B, a sheet or other suitable surface may have one or more coded targets (406) disposed on it. The sheet or other suitable surface may then be wrapped so as to form a cylindrical enclosure (404) as shown in FIG. 4B. A plurality of cameras (402) are disposed on or around the enclosure (404) and directed inward. As discussed above, the cameras (402) need not necessarily be directed to the center of the enclosure (404), but may instead focus on various aspects of, for example, a target object (408).

As discussed above, in one or more embodiments, the enclosure (404) contains one or more coded targets (406). As shown in the example in accordance with FIG. 4B, the coded targets (406) are disposed along each inside wall of the cylindrical enclosure (404). As described above, the coded targets (406) may include one or more suitable patterns.

FIG. 4C shows a perspective view of an example in accordance with one or more embodiments of the invention. In the example illustrated in FIG. 4C, an enclosure (404) takes the form of a cuboid structure with an open top, similar to that described in FIG. 4A. A plurality of cameras (not shown) may be disposed on or around the enclosure (404) directed inward toward the center of the enclosure by way of one or more camera openings (410). As discussed above, the cameras (not shown) need not necessarily be directed to the center of the enclosure (404), but may instead focus on various aspects of, for example, a target object (not shown). In one or more embodiments, the enclosure (404) also contains one or more coded targets (406). As shown in the example in accordance with FIG. 4A, the coded targets (406) are disposed along each wall of the cuboid. As described above, the coded targets (406) may include one or more suitable patterns.

Figure 5A:
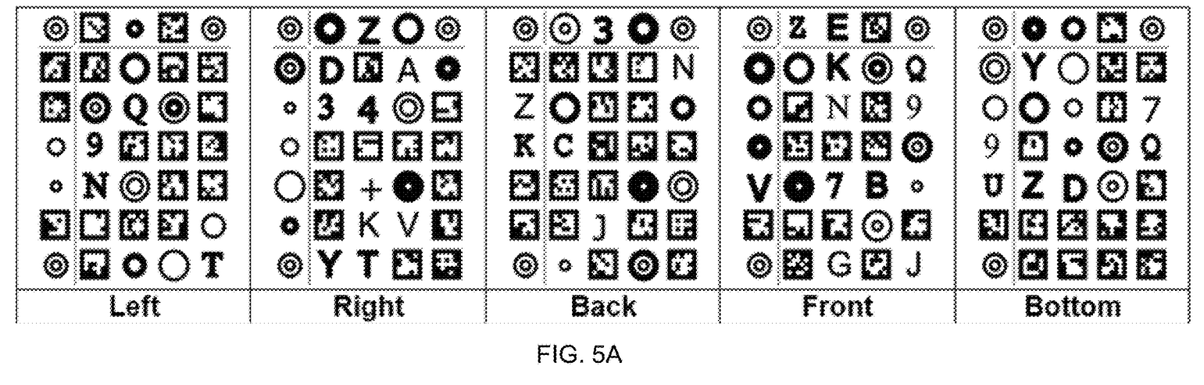
FIGS. 5A-5C show examples in accordance with one or more embodiments of the invention.
Figure 5B:
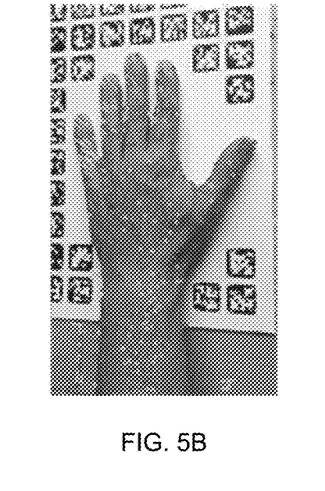
Figure 5C:
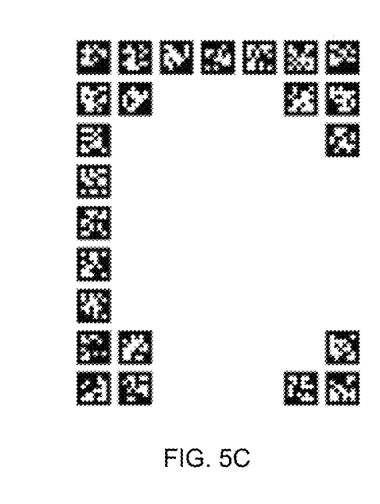

FIGS. 5A-5C show examples in accordance with one or more embodiments of the invention. In one or more embodiments, the example systems and methods described above in reference to FIGS. 1-3 are applied in the example shown in FIGS. 5A-5C. However, it will be apparent to one of ordinary skill in the art that different methods and systems may be applied.

FIG. 5A shows a series of coded targets in accordance with one or more embodiments of the invention. As described above, the coded targets may be binary random patterns or binary dot patterns, which are bounded by a surrounding box. The coded targets may be letters or digits in a suitably large font. Further, the coded targets may have long thin lines close to boundary of the coded target. In one or more embodiments, these lines may generally map to non-linear curves due to the radial distortion of a lens. The latter parameter may be of interest, as it may need to be estimated, corrected, and verified. Furthermore, these lines may extend in both dimensions, particularly if multiple patterns are used. Additionally, the lines may intentionally not intersect so as to support simpler line pixel collections in both directions.

As shown in FIG. 5A, one or more unique arrangements of patterns may form a coded target. For example, a left side coded target is formed by an inverted "L" shaped with concentric circles at the edges. The concentric circles may be formed by multiple black and white rings having incremental or staggered radii (e.g., 1, 2, 3, 4, . . . N). Uniqueness of patterns resulting from concentric circles may advantageously allow for ease of recognition by computer vision algorithms reliably and accurately. The left side coded target is further bounded by long thin lines that do not intersect. Additionally, the left side coded target contains a variety of letters, numbers, other concentric circles, and binary dot patterns. For example, rectangular coded targets (similar to QR codes) may also contain sufficient information for calibration either alone or in combination with the "L" shaped patterns of concentric circles. Accordingly, in one or more embodiments, the left side coded target forms a uniquely identifiable pattern.

By way of another example, a right side coded target is formed by an inverted "L" shaped with concentric circles at the edges, similar to those described above. The right side coded target is further bounded by long thin lines that do not intersect. Additionally, the right side coded target contains a variety of letters, numbers, other concentric circles, and binary dot patterns. Accordingly, in one or more embodiments, the right side coded target forms a uniquely identifiable pattern.

Similarly, a back side coded target, a front side coded target, and a bottom side coded target also contain various letters, numbers, other concentric circles, and binary dot patterns. Accordingly, in one or more embodiments, each coded target forms a uniquely identifiable pattern. Further, the example coded targets shown in FIG. 5A may be applied to the sides or walls of a cube or box.

FIG. 5B shows an example of a human hand (i.e., target object) covering a group of coded targets in accordance with one or more embodiments of the invention. Thus, in one or more embodiments, an image captured of the hand will reveal only the coded targets not covered by the hand. By way of each coded target being uniquely identifiable, various characteristics of the hand may be determined, for example, the dimensions of the hand.

FIG. 5C shows an example of a coded target in accordance with one or more embodiments of the invention. Specifically, FIG. 5C shows a coded target similar to that of FIG. 5B, without the hand (i.e., target object) in the scene. In other words, FIG. 5C shows what would be the outline of the hand based on the coded targets surrounding it.

Figure 6:
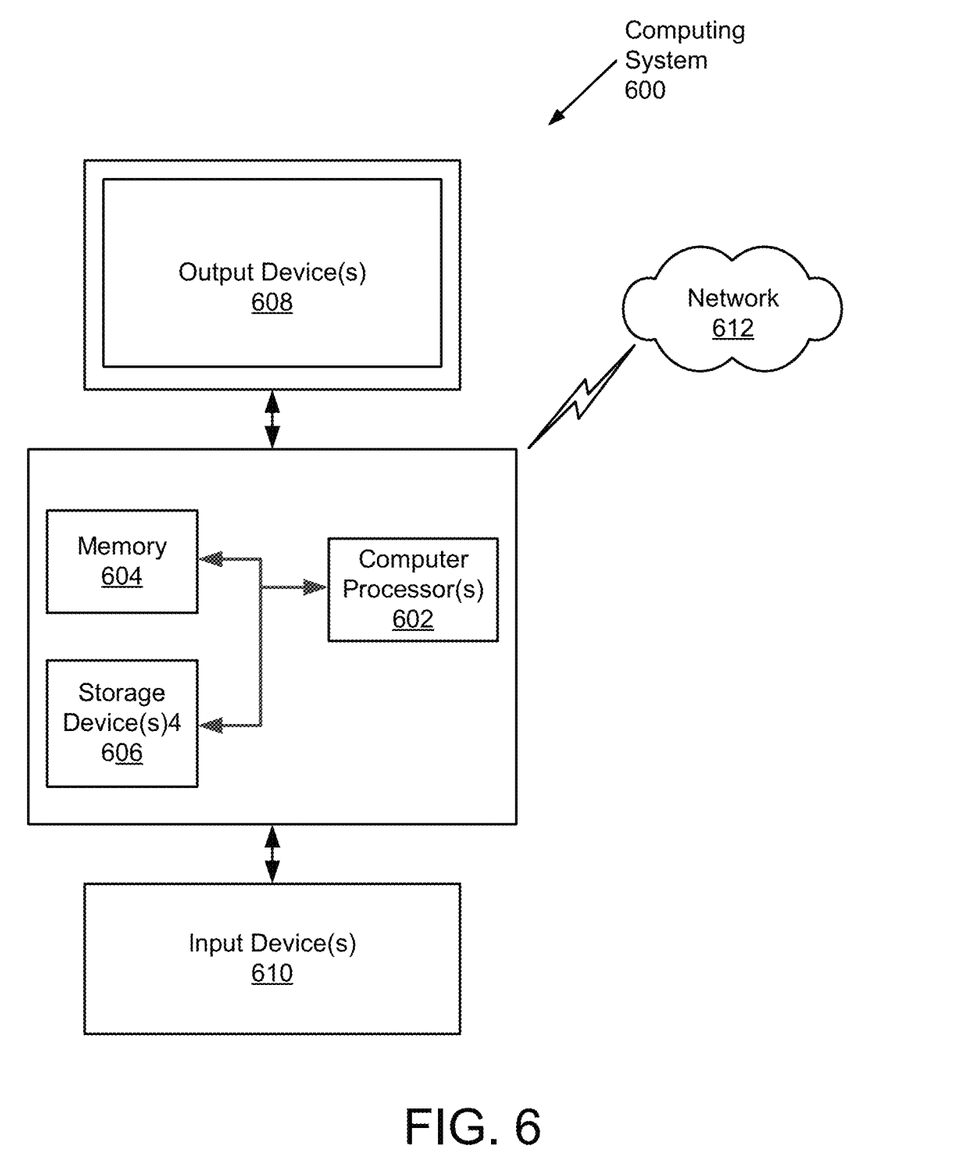
FIG. 6 shows a computing system in accordance with one or more embodiments of the invention.

Embodiments of the invention may be implemented on virtually any type of computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 6, the computing system (600) may include one or more computer processor(s) (602), associated memory (604) (e.g., random access memory (RAM), cache memory, flash memory, etc.), one or more storage device(s) (606) (e.g., a hard disk, an optical drive such as a compact disk (CD) drive or digital versatile disk (DVD) drive, a flash memory stick, etc.), and numerous other elements and functionalities. The computer processor(s) (602) may be an integrated circuit for processing instructions. For example, the computer processor(s) may be one or more cores, or micro-cores of a processor. The computing system (600) may also include one or more input device(s) (610), such as a touchscreen, keyboard, mouse, microphone, touchpad, electronic pen, or any other type of input device. Further, the computing system (600) may include one or more output device(s) (608), such as a screen (e.g., a liquid crystal display (LCD), a plasma display, touchscreen, cathode ray tube (CRT) monitor, projector, or other display device), a printer, a 3D printer, a CNC machine, external storage, or any other output device. One or more of the output device(s) may be the same or different from the input device(s). The computing system (600) may be connected to a network (612) (e.g., a local area network (LAN), a wide area network (WAN) such as the Internet, mobile network, or any other type of network) via a network interface connection (not shown). The input and output device(s) may be locally or remotely (e.g., via the network (612)) connected to the computer processor(s) (602), memory (604), and storage device(s) (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (600) may be located at a remote location and be connected to the other elements over a network (612). Further, one or more embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

One or more embodiments of the invention may exhibit one or more of the following advantages: cost may be kept low because current digital cameras and computers may be acquired for relatively minimal cost; the quality of the cameras may be very low end but with many cameras; the operation may be performed in one capture, or close to it (e.g., within 10 ms, but may be shorter or longer depending on the motion of the target object(s) and coded targets); subsequent automatic evaluation could be in the order of minutes or scalable depending on computational resources; operational ease may help a patient to not be exposed to extreme and/or uncomfortable situations (i.e., holding still for lengthy periods of time); high quality of a model results from an accuracy of one pixel equivalent or better (e.g., generally this may be 1 mm or less).

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for generating a three-dimensional (3D) model of a target object, the method comprising:
    obtaining one or more image capture settings;
    capturing, using the one or more image capture settings, a plurality of two-dimensional (2D) images each including at least a portion of a coded target and at least a portion of the target object;
    transmitting the plurality of 2D images to a model generation server;
    generating, by the model generation server based on the plurality of 2D images, the 3D model of the target object and one or more model characteristics of the 3D model, wherein
    the portion of the coded target that is captured comprises:
        patterns selected from a group consisting of: a concentric circle pattern, a binary dot pattern, and a character; and
        visible lines that do not intersect, that separate the patterns and that extend in both dimensions of the coded target.

2. The method of claim 1, further comprising:
    capturing a plurality of 2D calibration images each including at least a portion of a coded target;
    generating the one or more image capture settings based on the 2D calibration images; and
    storing the one or more image capture settings.

3. The method of claim 2, wherein each of the 2D calibration images further includes at least a portion of a calibration object.

4. The method of claim 1, wherein the one or more model characteristics comprise at least one of: a scale, a texture, and a color.

5. The method of claim 1, wherein each pattern of the coded target is unique.

6. The method of claim 1, further comprising:
    generating, by the model generation server, a 3D printable model based on the 3D model and the one or more model characteristics; and
    storing the 3D printable model.

7. A method for constructing a three-dimensional (3D) modeling scene, the method comprising:
    capturing a first image using a first camera and a second image using a second camera, wherein the first image comprises a first coded target and the second image comprises a second coded target;
    determining a first camera characteristic set based on the first image and the first coded target;
    determining a second camera characteristic set based on the second image and the second coded target;
    generating, based on the first camera characteristic set and the second camera characteristic set, one or more scene characteristics; and
    storing the one or more scene characteristics as the 3D modeling scene, wherein each of the first and second coded targets that are captured comprises:
        patterns selected from a group consisting of: a concentric circle pattern, a binary dot pattern, and a character; and
        visible lines that do not intersect, that separate the patterns and that extend in both dimensions of the coded target.

8. The method of claim 7, wherein the first camera characteristic set comprises at least one of: a camera angle and a camera orientation, and
    wherein the one or more scene characteristics comprise at least a scale.

9. A system for generating a three-dimensional (3D) model of a target object, the system comprising:
    an enclosure;
    a plurality of cameras disposed around the enclosure; and
    a model generation server, wherein
    the plurality of cameras capture, using one or more image capture settings, a plurality of two-dimensional (2D) images each including a coded target and at least a portion of the target object,
    the plurality of cameras transmit the plurality of 2D images to the model generation server,
    the model generation server generates the 3D model of the target object and one or more model characteristics of the 3D model based on the plurality of 2D images, and
    the coded target that is captured comprises:
        patterns selected from a group consisting of: a concentric circle pattern, a binary dot pattern, and a character; and
        visible lines that do not intersect, that separate the patterns and that extend in both dimensions of the coded target.

10. The system of claim 9, wherein the enclosure further comprises a plurality of coded targets.

11. The system of claim 9, further comprising:
    a camera group controller that controls the plurality of cameras,
    wherein the camera group controller obtains the one or more image capture settings prior to the capture by the plurality of cameras,
    wherein the camera group controller triggers the capture by the plurality of cameras, and
    wherein the plurality of cameras further transmit the plurality of 2D images to the model generation server via the camera group controller.

12. The system of claim 11, further comprising:
    a second camera group controller that controls a second plurality of cameras,
    wherein the second camera group controller obtains the one or more image capture settings,
    wherein the second camera group controller triggers the second plurality of cameras to capture, using the one or more image capture settings, a second plurality of 2D images each including a coded target and at least a portion of the target object, and
    wherein the second plurality of cameras transmit the second plurality of 2D images to the model generation server via the second camera group controller.

13. The system of claim 11,
    wherein the model generation server further comprises a memory,
    wherein the model generation server further generates a 3D printable model based on the 3D model and the one or more model characteristics and stores the 3D printable model in the memory.

14. The system of claim 11, wherein the enclosure forms one of: a cuboid, a cylinder, and a spheroid.

15. A system for constructing a three-dimensional (3D) modeling scene, the system comprising:
- an enclosure;
- a first camera and a second camera each disposed around the enclosure; and
- a model generation server, wherein
- the first camera captures a first image including a first coded target and transmits the first image to the model generation server,
- the second camera captures a second image including a second coded target and transmits the second image to the model generation server,
- each of the first and second coded targets that are captured comprises:
  - patterns selected from a group consisting of: a concentric circle pattern, a binary dot pattern, and a character; and
  - visible lines that do not intersect, that separate the patterns and that extend in both dimensions of the coded target, and
- the model generation server:
  - determines a first camera characteristic set based on the first image and the first coded target,
  - determines a second camera characteristic set based on the second image and the second coded target,
  - generates, based on the first camera characteristic set and the second camera characteristic set, one or more scene characteristics, and
  - stores the one or more scene characteristics as the 3D modeling scene.

16. The system of claim 15, wherein the enclosure further comprises the first coded target and the second coded target.

17. The system of claim 15, wherein the enclosure forms one of: a cuboid, a cylinder, and a spheroid.

18. The system of claim 15, further comprising:
- a camera group controller that controls the first camera and the second camera,
- wherein the camera group controller obtains one or more image capture settings prior to the capture by the first camera and the second camera,
- wherein the camera group controller triggers the capture by the first camera and the second camera, and
- wherein the first camera and the second camera further transmit the first image and the second image, respectively, to the model generation server via the camera group controller.

19. The method of claim 1, wherein the visible lines separate the patterns without physically overlapping with any of the patterns.

* * * * *